UNITED STATES PATENT OFFICE.

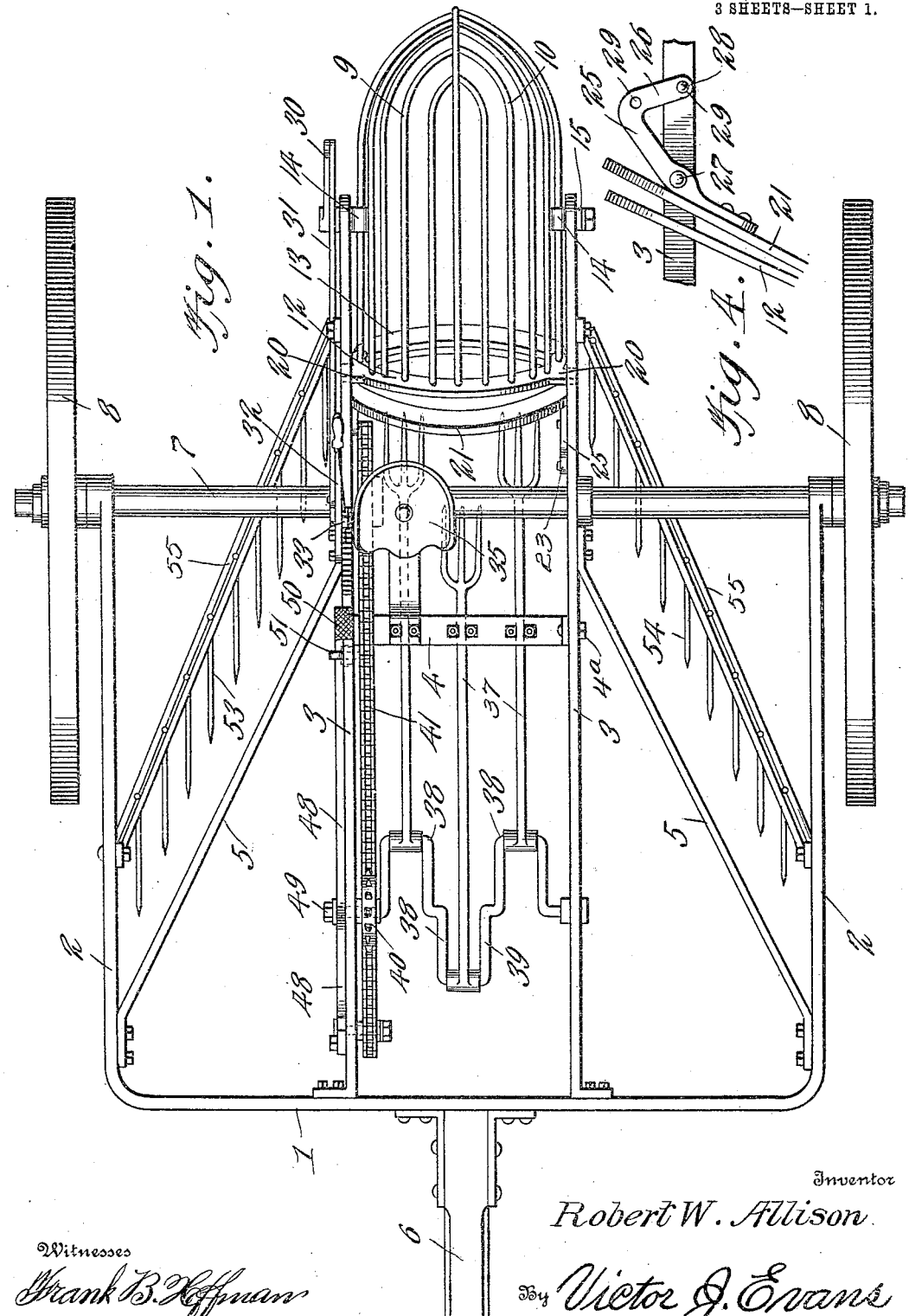

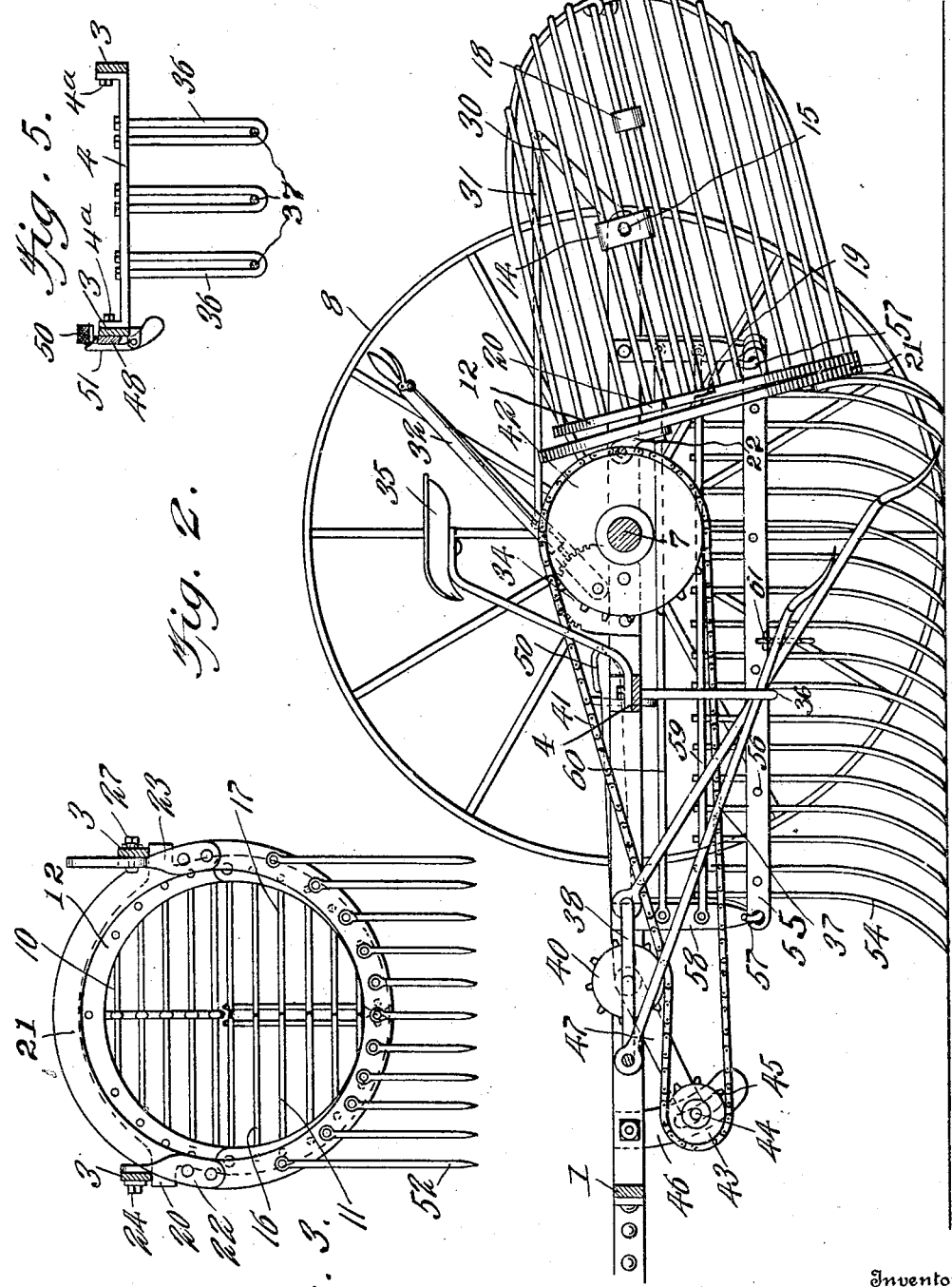

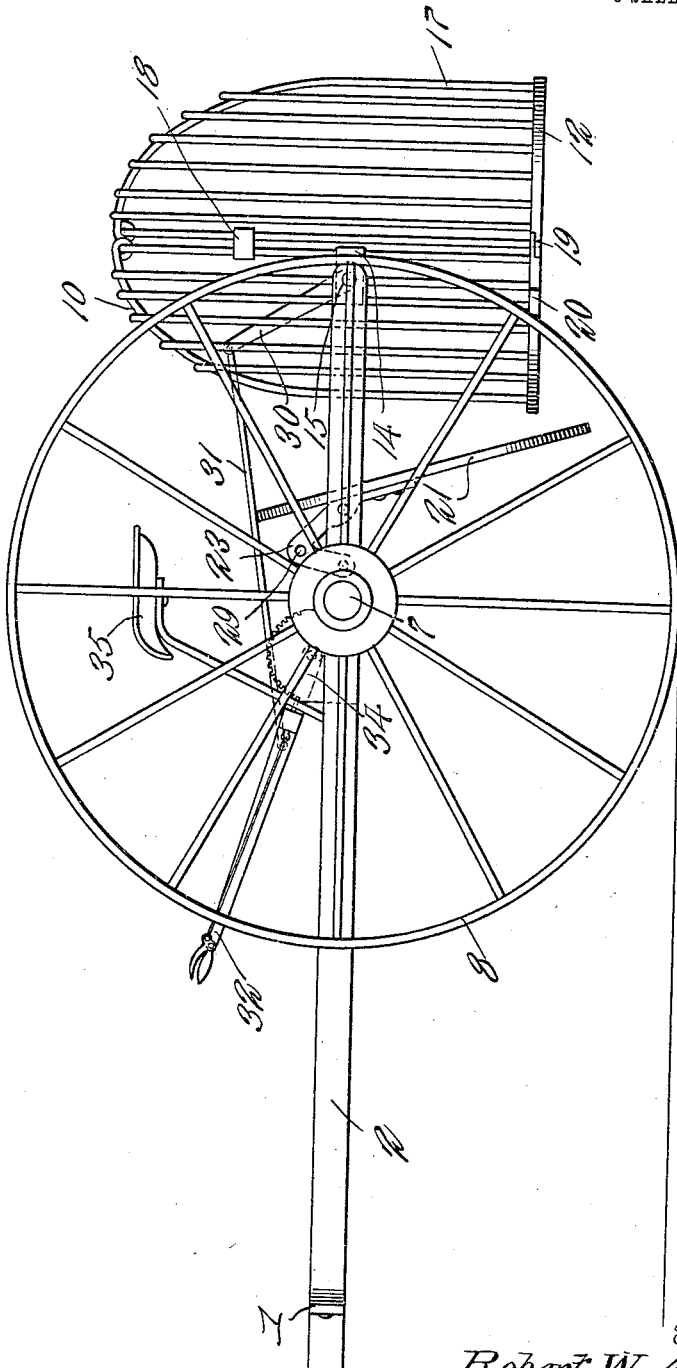

ROBERT W. ALLISON, OF SUPERIOR, PENNSYLVANIA.

HAY-COCKER.

946,480.  Specification of Letters Patent. Patented Jan. 11, 1910.

Application filed May 1, 1909. Serial No. 493,392.

*To all whom it may concern:*

Be it known that I, ROBERT W. ALLISON, a citizen of the United States, residing at Superior, in the county of Westmoreland and State of Pennsylvania, have invented new and useful Improvements in Hay-Cockers, of which the following is a specification.

This invention relates to an apparatus for gathering hay as it lies broadcast in the field after being cut, forming it into cocks or bundles and depositing the cocks or bundles upon the ground in rows so that it may be readily and conveniently transported for the formation of stacks, storage or other purposes.

The object of the invention is to provide a simple and inexpensive construction of apparatus which shall be under the complete control of the driver or operator, and whereby the operation of gathering the hay, forming it into cocks and dumping the cocks may be quickly and efficiently performed.

With these and other objects in view, the invention consists of the features of construction, combination and arrangement of parts hereinafter fully described and claimed, reference being had to the accompanying drawings, in which:—

Figure 1 is a top plan view of a hay cocking apparatus embodying my invention. Fig. 2 is a longitudinal section of the same. Fig. 3 is a cross section through the intermediate frame bars taken on a line in front of the basket and showing the latter in front elevation. Fig. 4 is a fragmentary side view showing a detail of construction of the basket supporting means. Fig. 5 is a cross section through the frame showing the transverse supporting bar and guide loops for the pitch forks. Fig. 6 is a view showing in side elevation the basket and its coöperating parts when the basket is in dumping position.

The apparatus embodies a main frame comprising a front cross bar 1, parallel outer side bars 2, a pair of parallel intermediate bars 3 fixed at their forward ends to the bar 1, a transverse bar 4 connecting and reinforcing the bars 3 intermediate their ends, and diverging brace bars 5 secured at their rear ends to the bars 3 in rear of the bar 4 and at their forward ends to the front ends of the bars 2. To the bar 1 is secured in any suitable manner a tongue or other draft appliance 6, and journaled in bearings in the bars 2 and 3 is a transverse axle or shaft 7 carrying supporting wheels 8.

Mounted at the rear of the frame is a basket or receptacle 9, composed of an upper section 10 and a lower section 11. Each of these sections is composed of a body formed of spaced longitudinal strands or rods of wire of proper gages united at their rear ends and fixed at their forward ends to the sections 12 and 13 of an annular head or frame ring forming the mouth of the basket. The upper section 10 of the basket, which is semi-circular or approximately so in form, is provided at the lower edges of its sides with bracket pieces 14 carrying pivot bolts 15, which are journaled in bearing openings in the rear ends of the bars 2 to adapt the basket as a whole to swing in a vertical plane. The lower half of the basket is also approximately semi-circular in form and composed of a pair of outwardly swinging sections 16 and 17, said sections being united at their upper longitudinal edges to the lower edges of the section 10 by pivot clasps 18, and the lower portion of the frame ring or head is divided on a line between said sections 16 and 17 and is pivotally connected with the section 12, as at 19, so that while the basket as a whole is adapted to swing from a horizontal position or from a position inclined to the horizontal to a perpendicular position, the sections 16 and 17 are adapted to swing laterally outward under the weight of the hay contained within the basket when the latter is tilted, and to return to normal or closed position when the basket itself is swung back into receiving position. The upper portion of the frame ring 12 is provided with lateral stop lugs or projections 20 to abut against the under sides of the bars 3 when the basket is in receiving position and to limit its upward tilting motion.

Supported by the bars 3 immediately in advance of the mouth of the basket is an abutment ring 21, which is of slightly larger diameter than the mouth of the basket, and is inclined at a downward and rearward angle to the perpendicular, as shown. This abutment ring 21 is supported by brackets 22 and 23 from the bars 3, as shown in Fig. 3, the bracket 22 being bolted or riveted at its lower end to the ring and secured at its upper end to the adjacent bar 3 by a bolt 24, while the bracket 23 is bolted or riveted at its lower end to the opposite side of the ring and provided with a right angular upper arm 25 having a downturned end 26, said bracket being connected by its main portion to the adjacent bar 3 by a pivot bolt 27 and having its end 26 connected with the bar by a bolt 28. The end 26 of the angular arm is provided with a plurality of openings 29 for passage of the bolt 28, by which construction the ring 21 may be initially swung to the desired angle on the bolts 24 and 27 as pivots, after which the nuts of said bolts may be tightened and the bolt 28 passed through the proper opening 29, to fix the ring in the desired angular position. When the basket is in receiving position, as shown clearly in Fig. 2, in which it inclines downwardly and forwardly at an oblique angle to the horizontal, the lower portion of the mouth of the basket formed by the sections of the lower half 13 of the frame ring abut against the lower portion of the abutment ring 21, thus staying and supporting the basket in such position and holding the sections 16 and 17 of said basket from outward pivotal movement. In order to enable the basket to be swung to dump the load, one of the pivot bolts 15 is provided with a crank arm 30, which is connected by a link 31 with an operating lever 32 pivoted to the adjacent frame bar 3 and carrying a pawl 33 to engage a rack 34 on said bar, by which the lever and basket may be locked in adjusted position.

The lever 32 is arranged in convenient relation to a driver's seat 35 which is mounted upon a supporting standard carried by the cross bar 4, and depending from this cross bar 4 is a transverse series of elongated vertical guide loops or bolts 36 through which extend the rods or shanks of a series of gathering or pitchforks 37. The rear ends of these forks are provided with tines to rake up and gather the hay and pitch the same into the basket through the open mouth thereof. The outer or forward ends of the shanks of the forks are pivotally connected with cranks 38 on a transverse shaft 39 journaled in bearings in the forward ends of the bars 3. Preferably three forks are employed and arranged in parallel relation, and the cranks 38 are disposed to project and retract the two side forks in unison and in alternation with the intermediate fork, which moves in a reverse direction. Through the throw of the cranks the forks are reciprocated back and forth and given and up and down motion, by which their tines are caused on their rearward sweep to gather the hay from the ground and on their upward movement to pitch or toss the same into the basket. On the shaft 39 is a sprocket 40 adapted to be driven by the upper stretch of a sprocket chain 41 which passes at its rear end around and is driven by a sprocket wheel 42, and passes at its forward end around an idle or guide sprocket 43 journaled on a bolt or pin 44 movable in a guide slot 45 in a bracket 46 fixed to and depending from the adjacent bar 3, which pin is carried by the angular and downwardly and forwardly extending end 47 of a lever 48 pivotally mounted on the adjacent end of the shaft 39, as at 49, and provided at its rear end with a foot piece 50 arranged to be conveniently depressed by the foot of the rider occupying the seat 35. When the lever is released, and swung upwardly, the pivot 44 swings downward in the slot 45 and lowers the upper stretch of the chain out of contact with the sprocket 40, thus throwing the gearing out of action in which it is maintained by the weight of the adjacent parts of the gearing. Upon depressing the foot piece 50, the sprocket 43 will be thrown upwardly in an obvious manner, thus projecting the upper stretch of the chain into engagement with the sprocket 40 so that motion will be communicated to the crank shaft to operate the forks. A pivot latch device 51 is mounted on the bar 3 and is provided with a tooth or shoulder to engage and hold the lever 48 depressed, said tooth or shoulder having a beveled nose, by which the catch may be thrown out of operation by the toe of the foot of the rider resting on the pedal 50, to enable the forks to be quickly thrown into action when desired. When the machine is not in use and is being transported from place to place, the cranks may be properly arranged to dispose the ends of the forks sufficiently above the surface of the ground to prevent them from being injured from stones or other objects.

In conjunction with the basket and gathering forks, a series of rakes is employed to gather and bring the hay into position to engage the forks in the forward movement of the implement. This raking mechanism comprises a central series of depending rake teeth 52 carried by the abutment ring 21 and side series of rake teeth 53 and 54 extending convergently from the forward portion of the frame to a point in line with said central rake teeth 52. Each set of rake teeth 53 and 54 is carried by a head bar 55 formed of spaced sections between which the upper ends of the teeth are clamped by bolts 56, and the ends of this bar are apertured for pivotal engagement with hooks 57 on the lower ends of brackets 58 fixed to and depending from the adjacent bars 2 and 3. The said brackets 58 are connected by upper and lower brace rods 59 and 60, by which they are strengthened to resist the strains imposed upon the rake. The bar 55 may be tilted inwardly and upwardly on the hooks 57 to throw the rake teeth out of engagement with the ground in the transportation of the implement from place to place, in which raised position the rake may be secured by means of a supporting hook 61 pivoted to said bar 54 and which may be engaged with the supporting rod 59.

In the operation of the implement, the levers are set to throw the crank shaft into action and support the basket in receiving position. As the implement moves forward, the side rakes gather the hay and sweep it to a central point, in which it is engaged and held from escaping at the rear by the rake 52. The hay thus gathered is taken up and tossed by the pitchforks into the basket 9. When the basket is filled to a sufficient degree to form a cock or bundle of the proper size, the lever 32 is unlatched and swung forwardly, and simultaneously the catch 51 is disengaged to throw the sprocket gearing out of action. By this means the action of the forks will be arrested, while the basket will be tilted downwardly and rearwardly to discharge the cock, it being understood that in this operation the upper front portion of the mouth of the basket swings forward into the abutment ring 21 to allow the basket to assume a perpendicular position, and that as said basket swings outwardly the sections 16 and 17 thereof will swing laterally outward under the weight of the cock and allow the same to dump upon the ground. When this operation is effected, the lever 32 is operated to swing the basket back to normal or receiving position, in which movement the sections 16 and 17 automatically close. During the dumping action the implement continues to move forward and gathers a mass of hay between the rakes, so that as soon as the sprocket gearing is again set into action upon the restoration of the basket to receiving position, the forks will rapidly take up the gathered mass of hay and toss the same into the basket for the formation and discharge of another cock. In this manner the cut hay lying broadcast in a field may be quickly and efficiently gathered and formed into cocks arranged in rows at desired intervals in the field, so that they may be conveniently taken up for the formation into a stack or for transportation or for other purposes.

The bar 4 is secured to the beams 3 by bolts 4ª, so that said bar may be pivotally adjusted at an angle on said bolts to elevate the forks above the ground surface, and held in such position by tightening said bolts.

Having thus fully described the invention, what is claimed as new, is:—

1. A hay cocker comprising a frame, a tilting basket pivotally mounted on the frame and having outwardly swinging lower sections, an abutment member on the frame for sustaining the basket in receiving position and holding said swinging sections closed, means for locking the basket in receiving position, means for releasing it for a dumping operation, and gathering means for filling the basket.

2. A hay cocker comprising a frame, an abutment ring mounted on the frame, a tilting basket adapted when in normal position to rest against said ring and provided with outwardly swinging lower sections, means for holding the basket in receiving position and releasing it for a dumping operation, and gathering means for filling the basket.

3. A hay cocker comprising a frame, a normally inclined abutment ring adjustably mounted on the frame for arrangement in different inclined positions, a tilting basket adapted when in normal position to rest against said ring and provided with outwardly swinging lower sections, means for holding the basket in receiving position and releasing it for a dumping operation, and gathering means for filling the basket.

4. A hay cocker comprising a frame, a tilting basket pivotally mounted on the frame, means for holding the basket in receiving position, means for releasing it for a dumping operation, a transverse crank shaft mounted upon the frame in front of the basket, forks slidably and pivotally supported by the frame and operated in reverse directions by the cranks of the shaft to take up and pitch the gathered hay into the basket, and means for driving said shaft.

5. A hay cocker comprising a frame, an abutment ring carried by the frame, a tilting basket adapted to rest in receiving position against the abutment ring, said basket being provided with trunnions journaled on the frame and having outwardly swinging lower sections, one of said trunnions being provided with a crank arm, an operating lever pivoted on the frame, locking means for holding said lever in adjusted position, a link connecting the lever with the crank arm, and gathering means for filling the basket.

6. A hay cocker comprising a supporting frame, an abutment ring carried by the frame and arranged at an upward and forward angle to the vertical, a tilting basket pivotally mounted on the frame and adapted to rest in receiving position against said abutment ring, said basket being provided with outwardly swinging bottom sections adapted to be held closed by the abutment ring when the basket is in receiving position, means for holding the basket in receiving position and releasing it to dump the load, supporting means for the abutment ring to hold the same in differently inclined positions, and gathering means for filling the basket.

7. A hay cocker comprising a supporting frame, a tilting basket pivotally mounted thereon, means for locking and releasing the basket, an abutment ring carried by the frame and forming a support for the basket and a guide for the feed of the hay thereinto, a transverse series of rake teeth upon the lower portion of the ring, coöperating sets of oppositely arranged rearwardly converging gathering teeth on the frame, forks for pitching the gathered hay into the basket, and means for driving said forks.

8. A hay cocker comprising a frame, a basket pivotally supported upon the frame, means for holding the same in receiving position and releasing it for a dumping operation, a transverse series of gathering teeth supported by the frame below the mouth of the basket, rearwardly converging oppositely arranged sets of gathering teeth carried by the frame, a shaft journaled on the frame and provided with oppositely projecting cranks, forks slidably and pivotally supported by the frame and operated in reverse directions by the cranks to take up and pitch the gathered hay into the basket, and means for driving said shaft.

9. A hay cocker comprising a frame, a dumping basket supported thereby, gathering means carried by the frame, a crank shaft carrying a sprocket wheel, forks operated by the cranks of the shaft, a main drive sprocket wheel operated by the running gear of the implement, an adjustable sprocket pinion on the frame in advance of the shaft, a drive chain passing around said main sprocket wheel and said sprocket pinion and having one of its stretches arranged to engage the sprocket wheels on the shaft, a pivoted lever for adjusting the sprocket pinion to throw such stretch of the chain into and out of engagement with the sprocket wheel on the shaft, means for locking said lever in position to hold the bearing in operative relation, and forks operated by the shaft for filling the basket.

10. A hay cocker comprising a frame including parallel bars, a dumping basket carried by the frame, means for controlling the operation thereof, an annular support between said bars in advance of the mouth of the basket, a central transverse set of rake teeth carried by said support, hangers pendent from the frame, rearwardly diverging sets of gathering teeth pivotally supported by said hangers, means for supporting said diverging sets of teeth when swung up to an inoperative position, reciprocating feed forks mounted on the frame, driving means therefor, and means for throwing said driving means into and out of operation.

In testimony whereof I affix my signature in presence of two witnesses.

ROBERT W. ALLISON.

Witnesses:
W. H. SMITH,
M. C. BRIDGE.